Jan. 9, 1951 B. A. WARMEY 2,537,434
METHOD AND APPARATUS FOR MAKING RESISTANCE ELEMENTS
Filed March 12, 1945
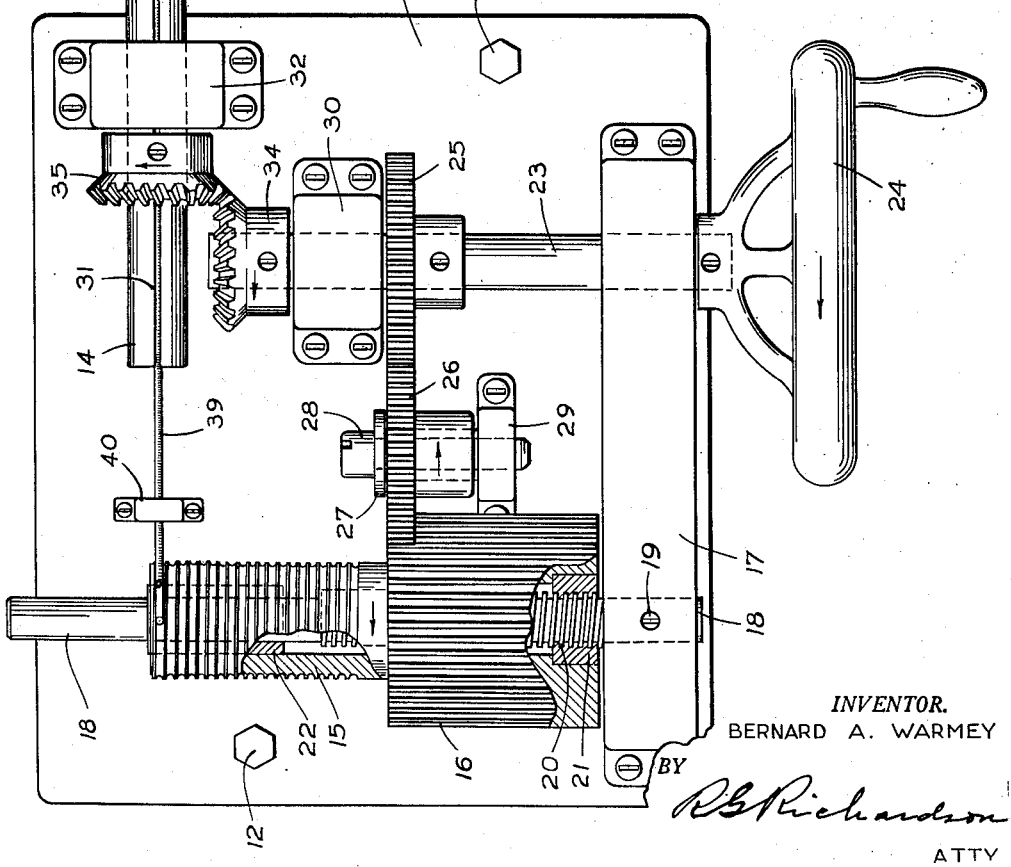
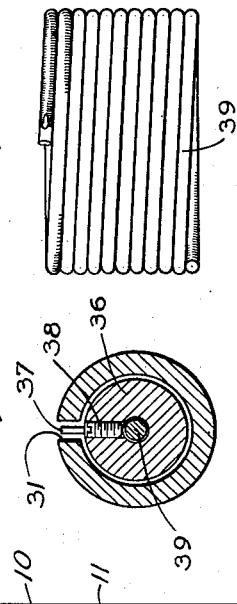
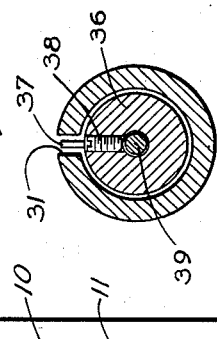
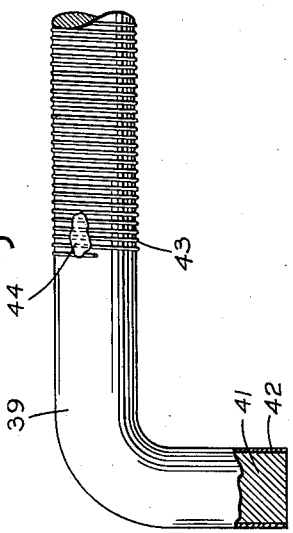
INVENTOR.
BERNARD A. WARMEY
BY R G Richardson
ATTY Patented Jan. 9, 1951

2,537,434

UNITED STATES PATENT OFFICE 2,537,434

METHOD AND APPARATUS FOR MAKING RESISTANCE ELEMENTS

Bernard A. Warmey, Delavan, Wis., assignor to The George W. Borg Corporation, Chicago, Ill., a corporation of Delaware Application March 12, 1945, Serial No. 582,319

8 Claims. (Cl. 153—67)

The present invention relates in general to resistance elements, but more in particular to resistance elements which have the form of a compound helix, and the object of the invention is a new and improved resistance element of this character and a new and improved method and apparatus for manufacturing the same.

A resistance element as referred to herein may be made by winding a resistance wire on a straight core, forming what may be referred to as a minor helix, and by then winding the core on a mandrel to form the major helix. The resistance element thus formed, after removal from the mandrel, may be used in the construction of a rheostat or potentiometer by mounting it in a suitable casing equipped with a rotatable slider or contact member which is adapted to travel along the turns of the major helix and make contact with successive turns of the minor helix.

A potentiometer embodying a resistance element in the form of a compound helix is disclosed in the pending application of Thomas B. Gibbs et al., Ser. No. 573,680, filed Jan. 20, 1945, now Patent 2,495,321. The potentiometer disclosed in this application has a casing of plastic material which is molded around the resistance element.

The invention is directed to the solution of a problem encountered in the manufacture of resistance elements for the potentiometers referred to in the preceding paragraph. The known compound helix resistance elements were wound with insulated resistance wire, which was objectionable because of the necessity of removing the insulation from the turns of the minor helix where such turns were engaged by the slider of the potentiometer. It was proposed, therefore, to use bare resistance wire wound on the core of the resistance element in spaced turns. This procedure was suggested by the knowledge that the molded casing in which the turns were embedded in the completed potentiometer would hold the turns firmly in spaced relation.

It was found, however, that when the core with its helical winding of bare resistance wire was wound on a mandrel to form the major helix the operation resulted in a loosening of the turns of the minor helix to such an extent that they were liable to become displaced, even with careful handling, and it was very difficult to avoid short circuiting some of the turns during the preliminary operations which were necessary before the actual molding operation could be performed. The loosening of the turns is attributed to the fact that when the core is wound to form the major helix it stretches somewhat and therefore is reduced in diameter. The reduction is very slight but is sufficient to cause the difficulty above described.

The problem thus presented was solved in a novel and effective manner. The core with its winding of resistance wire is wound on a mandrel as before to form the major helix but as the winding operation proceeds the straight or unwound portion of the core is rotated on its own axis in the proper direction to tighten the turns of the minor helix. This operation can be performed by hand by applying a continuous twisting torque to the end of the core as it is wound, but is preferably accomplished by a machine designed for the purpose and arranged to rotate the core in the proper direction and to the required extent simultaneously with the rotation of the mandrel on which the core is wound.

The invention thus makes it possible to manufacture a resistance element in the form of a compound helix comprising a helically wound core with a helical winding of bare resistance wire the turns of which are tight on the core and are not liable to become displaced.

The invention has the further advantage that the resistance wire may be wound on the core in such a direction that the rotation of the core during the operation of winding the core to form the major helix not only tightens the turns of the minor helix but also produces a major helix in which the turns are contracted tightly against each other. The major helix is therefore self-supporting and the resistance element is especially well suited for the manufacture of potentiometers in which the casing is molded around the resistance element, as described in the application previously referred to.

The invention and various features thereof will be described more in detail hereinafter, reference being had to the accompanying drawing, in which:

Fig. 1 is a plan view of a winding machine for carrying out the invention;

Fig. 2 is a cross section through the core rotating tube on the line 2—2, Fig. 1;

Fig. 3 shows a resistance element according to the invention, having the form of a compound helix; and Fig. 4 shows one end of a core having a helical winding of resistance wire thereon, as the core appears before it is wound on the machine to form the major helix.

Referring to the drawing, the various parts of the winding machine shown therein are mounted on a base 10, which may be a flat steel plate adapted to rest on the top of a bench or table (not shown) to which it is secured in any suitable manner, as by means of bolts 11 and 12.

The reference character 15 indicates a mandrel, which has a spiral groove thereon as shown. The mandrel 15 may be formed integrally with the gear 16.

The mandrel and gear are rotatably supported on a fixed horizontal shaft 18, one end of which is located in a hole in the support 17, where it is secured by a set screw 19. The support 17 extends vertically upward from the base 10 to which it is secured by screws as shown.

The mandrel 15 is mounted on shaft 18 by means of a bearing sleeve 22. There is also an internally threaded sleeve or bushing 21 set in the end of gear 16 which cooperates with a threaded portion 20 of shaft 18 to enable the latter to function as a lead screw, causing the mandrel and gear to move along shaft 18 when they are rotated on the shaft. The pitch of the lead screw is the same as the pitch of the spiral groove on the mandrel.

The means for rotating the gear 16 includes the shaft 23, the gear 25 mounted on the shaft, and the idler gear 26. The shaft 23 is rotatably mounted on the support 17 and a bearing 30, and is rotated by means of the hand wheel 24. The idler gear is rotatably mounted on the headed sleeve 27 which is clamped against the side of a support 29 by means of a cap screw 28.

The reference character 14 indicates the core rotating tube which may be a steel tube having a rather thick wall and having a slot 31 extending from one end of the tube to the other. The tube 14 is rotatably mounted by means of a bearing 32 secured to the base 10 and a bearing 33 which is secured to the bench or table on which base 10 is supported. The shaft 23 rotates the tube 14 and for this purpose is provided with a bevel gear 34 which meshes with a similar gear 35 on the tube.

A short cylindrical member 36 is shown in Fig. 2 and is also indicated in Fig. 1 by dotted lines. This member is slidable inside the tube 14 but cannot rotate relative to the tube, due to a projection 37 which extends into the slot 31. The member 36 has a hole drilled therein of the proper size to receive the core 39 to which member 36 may be secured by means of the set screw 38.

The guide 40, Fig. 1, is mounted on base 10 as shown, and has an opening which is in alignment with the axis of tube 14. This opening is of the proper size to receive a wound core 39 with a free sliding fit. The opening is preferably tapered at both ends.

Details of the construction of the core 39 and its winding 43 of bare resistance wire are shown in Fig. 4. The core may be a section of No. 14 copper wire 41, having an insulating coating 42 of suitable insulating material such as Formvar or Formex. These are trade names for insulating materials made of synthetic vinyl resins generally classified as aldehyde reaction products. The resistance wire may be about 2 mils in diameter, for example, and is wound on the core 39 in spaced turns while the core is straight. Any suitable and known type of winding machine may be used for this purpose. The ends of the winding are secured by soldering a few turns of wire together as indicated at 44, which prevents the coils from unwinding. The core 39 should be somewhat longer than the winding so that there will be an unwound section several inches in length at each end.

Other sizes of core wire and resistance wire may of course be used, the sizes specified above being given merely by way of example.

In order to prepare the machine for operation, the operator turns the hand wheel 24 in the proper direction to traverse the gear 16 and mandrel 15 along shaft 18 until these parts are in the position in which they are shown in the drawing, with the end of the gear approximately in engagement with the support 17. There is a radial hole drilled near the end of the mandrel and this hole now appears on top and in alignment with the opening in the guide 40.

The operator now takes a wound core 39 and passes the unwound section at one end through the guide 40, from the left, for a short distance. The cylindrical member 36 is now placed on the end of the core and the set screw 38 is turned in tightly, thus securing member 36 to the core. The member 36 is then inserted in the end of tube 14 and the core and the said member 36 are pushed into the tube until only about 6 inches or so of the core is left projecting to the left beyond the mandrel 15. With a pair of pliers the operator now bends the end of the core downward to form a hook as shown in Fig. 4 and then pushes the core enough farther into the tube to bring the hook to a position where it can enter the hole in the mandrel, being pressed into the hole if necessary. The apparatus is now in condition for the winding operation to begin.

The operator turns the hand wheel in the direction shown by the arrow, or in a counter-clockwise direction as seen from the front of the machine, and the gear 16 and mandrel 15 are rotated in the same direction. The rotation of the mandrel causes the core 39 to be drawn out of the tube 14 and wound up on the mandrel in the form of a helix, the turns of which are spaced apart and laid into the helical groove on the mandrel by the action of the lead screw 20, which advances the mandrel along the shaft 18 as the winding progresses.

The rotation of the hand wheel 24 also rotates the tube 14, which rotates the member 36 and the core 39 to which it is secured. In this connection it will be recalled that the member 36 is slidable along the tube but is constrained to rotate with the tube by the projection 37 located in the slot 31. The rotation of the core 39 has no permanent effect along the straight section of the core, which merely serves to communicate the torque to the point on the core where it is being applied to the mandrel. At this point a simultaneous bending and twisting of the core takes place in excess of the elastic limit of the material and the core is given a permanent set. That is, as the winding proceeds the straight section of the core is permanently rotated or twisted relative to the section already wound on the mandrel.

Now along the straight section of the core the winding 43 of resistance wire is tight on the core and rotates with it. The result is that at the point where the core is being applied to the mandrel, where it is bending and becoming slightly smaller in diameter, a winding action takes place which tightens the coils of resistance wire on the core, or rather, prevents them from becoming loose, which they would otherwise do. This winding action occurs only at the point where the core is bending as it goes on to the mandrel and where, as previously explained, the straight section of the core is permanently twisted relative to the section which has been wound on the mandrel. This action is continuous and is actually a winding action for each rotation of the core adds one turn to the resistance wire winding 43.

In the machine shown in the drawing the gear ratio between the mandrel 15 and tube 14 is 1 to 1 and accordingly one turn is added to the minor helix for each turn of the major helix. This gear ratio has been found to be satisfactory for winding a core wire of the size mentioned into a major helix having an outside diameter of about one and one half inches. For other sizes of core and helix the gear ratio might have to be changed. In any case the tube 14 should be rotated at such a speed relative to the speed of the mandrel that loosening of the turns of the resistance wire on the core is prevented. The speed of the tube may be high enough to actually tighten the turns somewhat but should not be so high as to unduly strain the resistance wire.

The operator continues the operation until the entire wound portion of the core 39 has been wound up on the mandrel. At this time the cylindrical member 36 will have emerged from the tube 14 and can be removed from the end of the core by loosening the set screw 38. The hand wheel is then rotated a little more, sufficient to draw the end of the core through the guide 40, and the end is pressed down against the mandrel.

This completes the winding operation. The turns of the helix into which the core has been formed tend to contract and hug the mandrel tightly. In order to remove the core from the mandrel the operator lifts the hook at the end of the first turn out of the hole in the mandrel and then while holding the core with one hand rotates the hand wheel 24 in a direction opposite to that in which it was rotated during the winding operation. This unscrews the mandrel from the core and at the same time brings it into the proper position for winding another core.

All that now remains to be done is to cut off the unwound end sections of the core close to the ends of the winding 43 and the resistance element is completed. Fig. 3 shows the complete resistance element.

As already mentioned, a resistance element made in accordance with the invention is especially well adapted for the manufacture of potentiometers by a process in which the casing is molded around the resistance element, as described in the Gibbs et al. application previously referred to. In this process a mold is used which has a helically grooved core for supporting the resistance element during the molding operation. Due to the fact that the turns or coils of the major helix of the resistance element are tensioned against each other the resistance element may be simply screwed on to the core where it is retained securely without any support other than that afforded by the contraction of the coils on the core of the mold. Of perhaps greater importance is the fact that the turns or coils of the resistance wire winding 43 are so tight on the core 39 that the operation of screwing the resistance element on the core of the mold, or other handling to which the resistance element may be subjected, involves no danger of displacing the coils and enables these operations to be carried out without any special precautions in this regard.

While a particular use for the resistance element has been pointed out, it will be clear that it can be used to advantage in various other types of rheostats and potentiometers.

The invention having been described, that which is believed to be new and for which the protection of Letters Patent is desired will be pointed out in the appended claims.

I claim:

1. The method of forming a major helix of a core having a minor helix of resistance wire wound thereon, which comprises winding said core on a suitable support to form said major helix, the winding starting with one end of the core and progressing substantially to the other end thereof, simultaneously axially rotating the unwound portion of the core and the portion of the minor helix carried thereon as a whole, to thereby successively tighten the turns of the minor helix as the unit sections of the core encircled thereby are bent during the winding operation, and progressively straining said core beyond its elastic limit by said rotation and said winding to impart a permanent set to the core throughout the wound portion thereof which maintains the turns of the minor helix tight on the core, the direction of said rotation being such that the turns of the major helix contract against each other after the major helix is removed from the support.

2. The method of forming a major helix of a core having a minor helix of resistance wire wound thereon, which comprises securing one end of said core to a mandrel, rotating said mandrel to bend said core thereabout in the form of a helix, and simultaneously rotating the unwound portion of said core on its own axis, said bending and rotating producing a progressive deformation of the end of the core by straining the same beyond its elastic limit at successive points where the core is bent, the direction in which the core is rotated being so related to the direction of rotation of the mandrel that the turns of the major helix contract against each other after removal from the mandrel and the direction in which the core is rotated being so related to the direction in which the minor helix is wound on the core that the deformation of the core increases the number of turns in the minor helix.

3. The method of making a resistance element in the form of a compound helix, which comprises winding a resistance wire on a solid metallic core of relatively inelastic material, securing the ends of said winding against rotation relative to said core, winding said core into a helix starting at one end thereof, simultaneously applying a rotative torque to said core at the other end thereof, and utilizing the diminishing unwound portion of the core to transmit said torque to successive unit sections of said core as they are bent by the winding operation, thereby permanently angularly displacing and setting each said section with respect to the preceding section, the direction of displacement being such that the number of turns of the resistance wire is increased.

4. A method of making a resistance element having the form of a compound helix comprising winding a resistance wire on a core to form a minor helix having spaced turns, and thereafter simultaneously winding said core on a support to form a major helix and twisting said core, to stress said core beyond its elastic limit and impart a permanent set at its zone of application to said support.

5. A winding machine comprising a mandrel mounted for rotation about an axis and adapted to have a core secured thereto, core support means mounted for rotation about an axis in a plane intersecting the first said axis, means slidably and relatively nonrotatably carried by said support means and adapted to be secured to said core, means for simultaneously rotating said mandrel and support means about their respective axes, the speeds of rotation being correlated whereby the core is simultaneously bent about said mandrel and twisted about its own axis, the combined bending and twisting working the core beyond its elastic limit to impart a permanent set at successive points of application to said mandrel.

6. The winding machine as claimed in claim 5 wherein said support means comprises a tube containing a groove and said slidably carried means has a portion riding in said groove.

7. The winding machine as claimed in claim 5 wherein the means for rotating said mandrel and support means comprises intermeshing gears.

8. The winding machine as claimed in claim 5 wherein said mandrel is mounted for axial movement, and including means for axially moving said mandrel in timed relationship with rotation of said mandrel to maintain the successive points where the core is applied to the mandrel in alignment with said core support means.

BERNARD A. WARMEY.

REFERENCES CITED

The following references are of record in the file of this patent:

UNITED STATES PATENTS

| Number | Name | Date |
| --- | --- | --- |
| 218,741 | Higgins | Aug. 19, 1879 |
| 952,582 | Ritter | Mar. 22, 1910 |
| 1,144,217 | McCarter | June 22, 1915 |
| 1,209,568 | Dorceloh et al. | Dec. 19, 1916 |
| 1,295,835 | Andren | Apr. 4, 1919 |
| 1,327,728 | Parker | Jan. 13, 1920 |
| 1,538,161 | Bourn | May 19, 1925 |
| 1,630,649 | Ziola | May 31, 1927 |
| 1,632,095 | Newton | June 14, 1927 |
| 1,778,514 | Still | Sept. 14, 1930 |
| 2,018,209 | Gogan | Oct. 22, 1935 |
| 2,056,028 | Wadsten | Sept. 29, 1936 |
| 2,218,345 | Spaeth | Oct. 15, 1940 |
| 2,227,869 | Thiemer | Jan. 7, 1941 |
| 2,298,923 | Beebe | Oct. 13, 1942 |
| 2,306,925 | Aicher | Dec. 29, 1942 |
| 2,363,826 | Yellin | Nov. 28, 1944 |

FOREIGN PATENTS

| Number | Country | Date |
| --- | --- | --- |
| 182,574 | Great Britain | July 7, 1922 |